(12) United States Patent
Suzuki et al.

(10) Patent No.: US 8,465,158 B2
(45) Date of Patent: Jun. 18, 2013

(54) LIGHT SOURCE DEVICE, PROJECTION APPARATUS, AND PROJECTION METHOD

(75) Inventors: Hideo Suzuki, Ome (JP); Mamoru Shibasaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 409 days.

(21) Appl. No.: 12/955,024

(22) Filed: Nov. 29, 2010

(65) Prior Publication Data
US 2011/0128507 A1 Jun. 2, 2011

(30) Foreign Application Priority Data

Nov. 30, 2009 (JP) ................................. 2009-272676

(51) Int. Cl.
G03B 21/14 (2006.01)
G03B 21/16 (2006.01)
H05B 37/02 (2006.01)

(52) U.S. Cl.
USPC ................ 353/85; 353/31; 353/121; 362/231

(58) Field of Classification Search
USPC . 353/31, 85; 362/553, 555, 561, 231; 372/23, 372/29.014, 29.015
See application file for complete search history.

(56) References Cited

U.S. PATENT DOCUMENTS

| 7,920,610 | B2 * | 4/2011 | Loeber et al. | 372/29.014 |
| 8,177,389 | B1 * | 5/2012 | Kropf | 362/231 |
| 2010/0128226 | A1 * | 5/2010 | Shibasaki | 353/31 |
| 2012/0050697 | A1 * | 3/2012 | Suzuki | 353/85 |

FOREIGN PATENT DOCUMENTS

| CN | 101071259 A | 11/2007 |
| JP | 11-185975 A | 7/1999 |
| JP | 2006-330177 A | 12/2006 |
| JP | 2008-085324 A | 4/2008 |
| WO | WO 2008/093462 A1 | 8/2008 |

OTHER PUBLICATIONS

Chinese Office Action dated Feb. 29, 2012 (and English translation thereof) in counterpart Chinese Application No. 201010570780.5.
Japanese Office Action dated Sep. 6, 2011 (and English translation thereof) in counterpart Japanese Application No. 2009-272676.

* cited by examiner

*Primary Examiner* — William C Dowling
(74) *Attorney, Agent, or Firm* — Holtz, Holtz, Goodman & Chick, P.C.

(57) ABSTRACT

A plurality of semiconductor light-emitting elements separately emits light of each of a plurality of colors. A reference signal output section outputs a reference signal for each of the plurality of colors. A selection section selects a reference signal for each of the plurality of colors output from the reference signal output section in accordance with a light-emission timing of each of the plurality of semiconductor light-emitting elements. An operation control section, provided for each of the plurality of semiconductor light-emitting elements, holds an operation value fitted to a light-emitting characteristic of a corresponding semiconductor light-emitting element and converts the reference signal selected by the selection section by an operation. A drive section drives corresponding one of the plurality of semiconductor light-emitting elements on the basis of a signal which has converted by the operation control section.

14 Claims, 6 Drawing Sheets

US 8,465,158 B2

LIGHT SOURCE DEVICE, PROJECTION APPARATUS, AND PROJECTION METHOD

CROSS-REFERENCE TO RELATED APPLICATIONS

This application is based upon and claims the benefit of priority from the prior Japanese Patent Application No. 2009-272676, filed Nov. 30, 2009, and including specification, claims, drawings and summary, the entire contents of which are incorporated herein by reference.

BACKGROUND OF THE INVENTION

1. Field of the Invention

The present invention relates to a light source device, a projection apparatus, and a projection method using a plurality of semiconductor light source elements.

2. Description of the Related Art

In order to efficiently and safely drive a light source constituted of a plurality of semiconductor elements, it is desirable that a method in which drive power is separately optimized for each of the elements to correct unevenness in quality between the elements be employed.

For example, when a laser diode (hereinafter referred to as an "LD") is employed as a semiconductor light-emitting element; a rate of change of light output power for a change in drive current is very large in the LD. For this reason, in a light source device in which a plurality of LDs are used, taking the variation in the light-emitting characteristic of each LD into consideration, when all the LDs are driven by a current of the same amount, differences in output power between the LDs are liable to conspicuously appear, and there are even cases where there appear some elements lead to breakage due to being given a drive current of a large amount.

Further, in a backlight in which a large number of light-emitting diodes (LEDs) which are semiconductor light-emitting elements and are used for a liquid crystal display panel, it is necessary to carry out current value control separately for each element in order to prevent unevenness in luminance due to variation of each element.

Furthermore, in a LED backlight apparatus employing the field-sequential system, in a field of each of colors of red, green, and blue, a group of LEDs each of which emits light of a corresponding color of the fields is driven by time division. At that time, when the luminance is changed for each block in accordance with an image by providing drive current values with differences in level between the fields of the colors of red, green, and blue, or by dividing the light-emission range into a plurality of blocks, the LED group is switched in control states of several levels at high speed.

In order to realize the above-mentioned control, for each of all the constituent semiconductor light-emitting elements, a control section corresponding to each of the constituent semiconductor light-emitting elements on a one-to-one basis is separately prepared. Furthermore, a configuration is required in which a conversion table for control is used for each control section, and management or operation of data stored in the table is executed at high speed in real time.

In order to realize a configuration for carrying out control for each of a plurality of light source elements, both the hardware configuration and software processing are required to have complicated and large-scale configurations. Accordingly, this leads to an increase in the mounting area resulting from an increase in the number of components, increase in apparatus size, increase in the load of the control section, and increase in cost.

BRIEF SUMMARY OF THE INVENTION

Accordingly, it is an object of the present invention to provide a light source device, a projection apparatus, and a projection method capable of driving each of a plurality of semiconductor light-emitting elements such that each semiconductor light-emitting element emits light at an appropriate amount of light.

According to one aspect of the present invention, there is provided a light source device comprising: a plurality of semiconductor light-emitting elements configured to separately emit light of each of a plurality of colors; a reference signal output section configured to output a reference signal for each of the plurality of colors; a selection section configured to select a reference signal for each of the plurality of colors output from the reference signal output section in accordance with a light-emission timing of each of the plurality of semiconductor light-emitting elements; an operation control section provided for each of the plurality of semiconductor light-emitting elements, and configured to hold an operation value fitted to a light-emitting characteristic of a corresponding semiconductor light-emitting element and to convert the reference signal selected by the selection section by an operation; and a drive section configured to drive corresponding one of the plurality of semiconductor light-emitting elements on the basis of a signal which has converted by the operation control section.

According to another aspect of the present invention, there is provided a projection apparatus comprising: a plurality of semiconductor light-emitting elements configured to separately emit light of each of a plurality of colors; a reference signal output section configured to output a reference signal for each of the plurality of colors; a selection section configured to select the reference signal for each of the plurality of colors output from the reference signal output section in accordance with a light-emission timing of each of the plurality of semiconductor light-emitting elements; an operation control section provided for each of the plurality of semiconductor light-emitting elements, and configured to hold an operation value fitted to a light-emitting characteristic of a corresponding semiconductor light-emitting element and to convert the reference signal selected by the selection section by an operation; a drive section configured to drive corresponding one of the plurality of semiconductor light-emitting elements on the basis of the signal which has converted by the operation control section; an input section configured to input an image signal; and a projection section configured to form and project a light figure of a color corresponding to the image signal input by the input section by using light-source light from each of the plurality of semiconductor light-emitting elements driven by the drive section.

According to still another aspect of the present invention, there is provided a projection method for use in a projection apparatus including a plurality of semiconductor light-emitting elements configured to separately emit light of a plurality of colors, an input section configured to input an image signal, and a projection section configured to form and project a light figure of a color corresponding to the image signal input by the input section, the method comprising: outputting a reference signal for each of the plurality of colors; selecting the output reference signal for each of the plurality colors in accordance with a light-emission timing of each of the plurality of semiconductor light-emitting elements; holding an operation value fitted to a light-emitting characteristic of a corresponding semiconductor light-emitting element and converting the selected reference signal by an operation; and driving each of the plurality of semiconductor light-emitting elements on the basis of the signal which has converted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of a case where the present invention is applied to a Digital Light Processing (DLP) [registered trademark] data projector will be described below with reference to the drawings.

Figure 1:
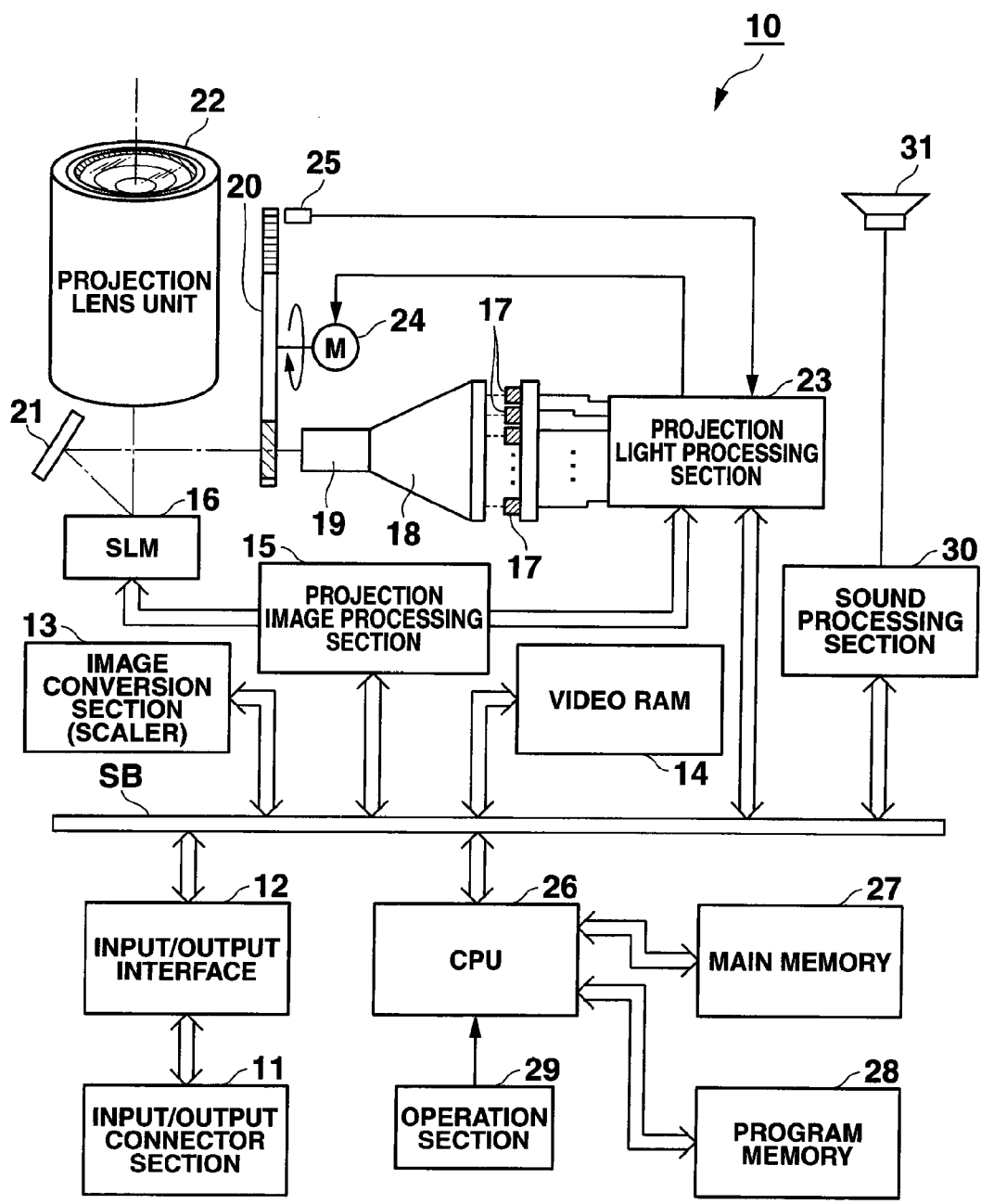
FIG. 1 is a block diagram showing the schematic functional configuration of a data projector apparatus according to an embodiment of the present invention.

FIG. 1 is a block diagram showing the schematic functional configuration of a data projector apparatus 10 according to this embodiment.

An input/output connector section 11 includes various input/output terminals such as a pin-jack (RCA) video input terminal, D-sub 15 RGB input terminal, Universal Serial Bus (USB) connector, and the like.

Image signals of various standards to be input from the input/output connector section 11 are input to an image conversion section 13 generally also called a scaler through an input/output interface 12, and system bus SB.

The image conversion section 13 converts the input image signal into an image signal of a predetermined format appropriate for projection, and writes the converted image signal to a video RAM 14 serving as a buffer memory for display. Thereafter, the image conversion section 13 reads the image signal to transmit the signal to a projection image processing section 15.

At this time, data such as symbols or the like indicating various operational states for on-screen display (OSD) are also processed to be superposed on the image signal in the video RAM 14 as the need arises. The processed image signal is read and transmitted to the projection image processing section 15.

The projection image processing section 15 display-drives a micromirror element 16 which is a spatial light modulator (SLM) by a time-division number obtained by multiplying a predetermined frame rate, for example, 60 frames/second, by a division number of color components, and display gradation number in accordance with the image signal transmitted thereto.

The micromirror element 16 individually subjects each of inclination angles of a plurality of minute mirrors arranged in an array corresponding to, for example, XGA (1024 lateral pixels×768 vertical pixels) to an on/off operation at high speed, thereby forming a light figure by using light reflected from each of the minute mirrors.

On the other hand, by the oscillation of a group of LDs 17 serving as the semiconductor light-emitting elements constituting the light source, laser light close to, for example, a wavelength of 340 nm is generated, and is applied to a point on a circumference of a fluorescent substance wheel 20 which is a rotating body through a light-house 18 and integrator 19.

The light-house 18 includes a larger side of a prismoidal member in which a reflection mirror is provided on an inner surface in a tensioned state as an entrance opening, and smaller side thereof as an exit opening, and condenses and outputs the laser light oscillated by the semiconductor light-emitting elements (LDs) 17.

The integrator 19 subjects the laser light output from the light-house to diffuse reflection inside the integrator in order that the luminance distribution may become uniform.

The fluorescent substance wheel 20 is constituted by dividedly arranging three fan-shaped fluorescent substance plates emitting fluorescence of red, green, and blue by irradiation of, for example, ultraviolet light on the circumference thereof. The fluorescence of any one of red, green, and blue emitted from the fluorescent substance wheel 20 by the irradiation of the laser light output from the integrator 19 is subjected to total reflection by a mirror 21, and is applied to the micomirror element 16.

Further, a light figure is formed by the reflected light from the micromirror element 16. The formed light figure is magnified through a projection lens unit 22, and is projected on a screen (not shown) which is the projection object.

The semiconductor light-emitting elements (LDs) 17 are excited by a projection light processing section 23 to oscillate laser light of the ultraviolet region. The projection light processing section 23 further carries out control of a motor (M) 24 configured to rotate the fluorescent substance wheel 20, and marker sensor 25.

The marker sensor 25 is arranged in opposition to a rotation peripheral end of the fluorescent substance wheel 20. The marker sensor 25 outputs a pulse on the basis of such timing that the sensor 25 is opposed to a marker (not shown) arranged at a point on the peripheral end of the fluorescent substance wheel 20 as a detection signal. The projection light processing section 23 detects a rotational phase and period of the fluorescent substance wheel 20 on the basis of the pulse output from the marker sensor 25.

The projection light processing section 23 executes control including control of light-emission timing and emission intensity of each of the semiconductor light-emitting elements (LDs) 17, rotation of the fluorescent substance wheel 20 carried out by the motor 24, and detection of the rotational phase and period of the fluorescent substance wheel 20 from the marker sensor 25 under the integrated control of a CPU 26 to be described later.

The CPU 26 controls the operation of each block in an integrating manner. The CPU 26 is directly connected to a main memory 27 and program memory 28. The main memory 27 is constituted of a DRAM, and functions as a working memory for a control operation of the CPU 26. The program memory 28 is constituted of an electrically rewritable and nonvolatile memory in which an operation program, various standardized data items, and the like are stored.

The CPU 26 executes various projection operations in accordance with key operation signals from an operation section 29.

The operation section 29 includes a key operation section provided in a main body of the data projector apparatus 10, and laser light reception section configured to receive infrared light from a remote controller (not shown) dedicated to the data projector apparatus 10. The operation section 29 outputs a key operation signal based on a key operated by a user by using the key operation section of the main body or remote controller directly to the CPU 26.

In the program memory 28, light-emission drive current values for each of the LDs 17 at the time of shipment from the plant, specifically, operation values corresponding to a maximum current value and minimum current value are stored in addition to the operation program, various standardized data items, and the like described above.

The CPU 26 is further connected also to a sound processing section 30 through the system bus SB. The sound processing section 30 is provided with a sound source such as a PCM sound source or the like, converts sound data input thereto at the time of a projection operation into analog data, drives a speaker section 31 to loudspeaker-release sound or generate beep sound or the like as the need arises.

Next, the detailed functional configurations of the LDs 17 functioning as the semiconductor light-emitting elements, and part of the projection light processing section 23 configured to carry out drive of the elements will be described below with reference to FIG. 2.

In the projection light processing section 23, prior to the processing of the fields of red, green, and blue, a reference value of each of the fields is written to a reference signal output section 41. On the basis of the written reference values, and a reference voltage to be separately given, the reference signal output section 41 outputs reference maximum current values of the fields of red, green, and blue to a selection section 42 as a red reference signal, green reference signal, and blue reference signal.

The selection section 42 cyclically selects one of the reference signals on the basis of a given selection timing signal, and outputs the cyclically selected reference signals to operation control sections 43 which are prepared according to the number of the LDs 17.

Further, an operation value corresponding to each of the LDs 17 is written in advance to each of the operation control sections 43. Each of the operation control sections 43 carries out an operation on the basis of the operation value written thereto, and by using a reference signal to be given thereto from the selection section 42. Each of the operation control sections 43 outputs a dimming control signal corresponding to the maximum current and minimum current of each of the LDs 17 as an operation result.

When the output of each of the operation control sections 43 is transmitted to each of light source drive sections 44, each of the light source drive sections 44 drives each of the LDs 17 which are semiconductor light-emitting elements by a current value based on the dimming control signal. Each of the LDs 17 emits light at unified and desired luminance in accordance with the characteristic of each element.

Figure 2:
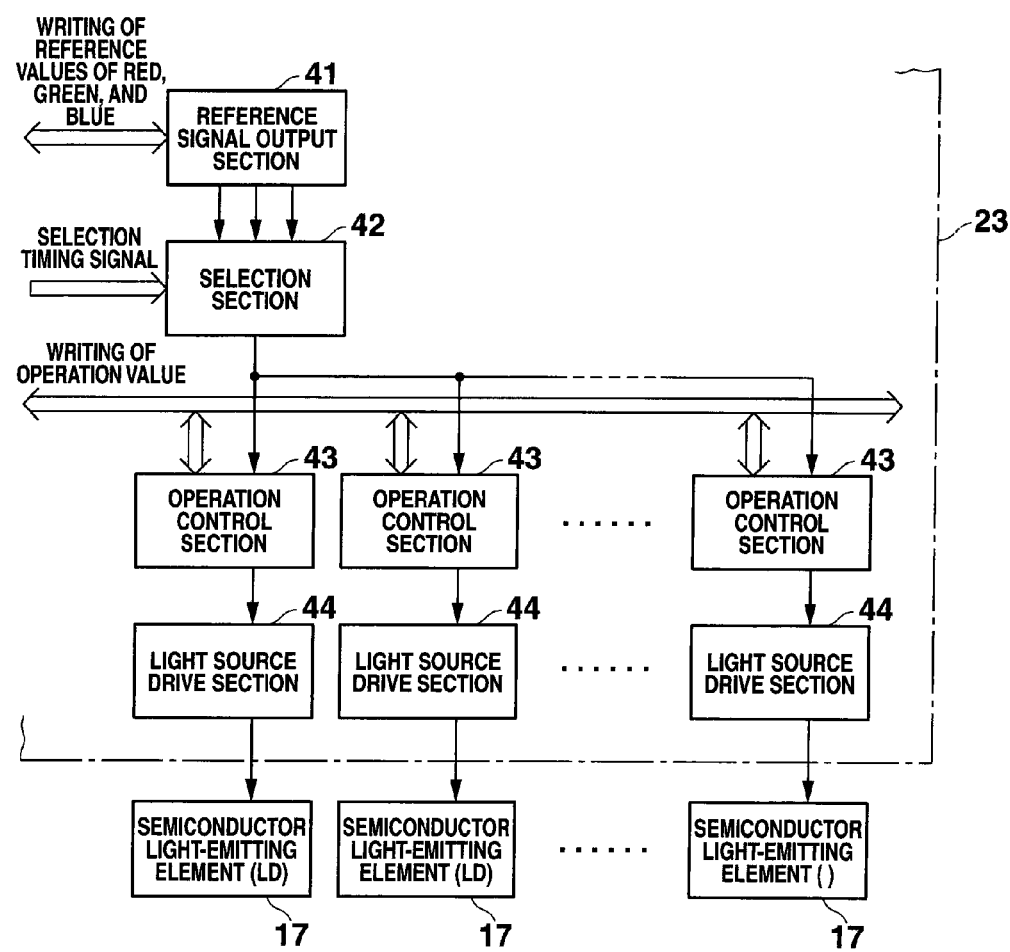
FIG. 2 is a block diagram showing the detailed functional configuration of part of a projection light processing section of FIG. 1 according to the embodiment.
Figure 3:
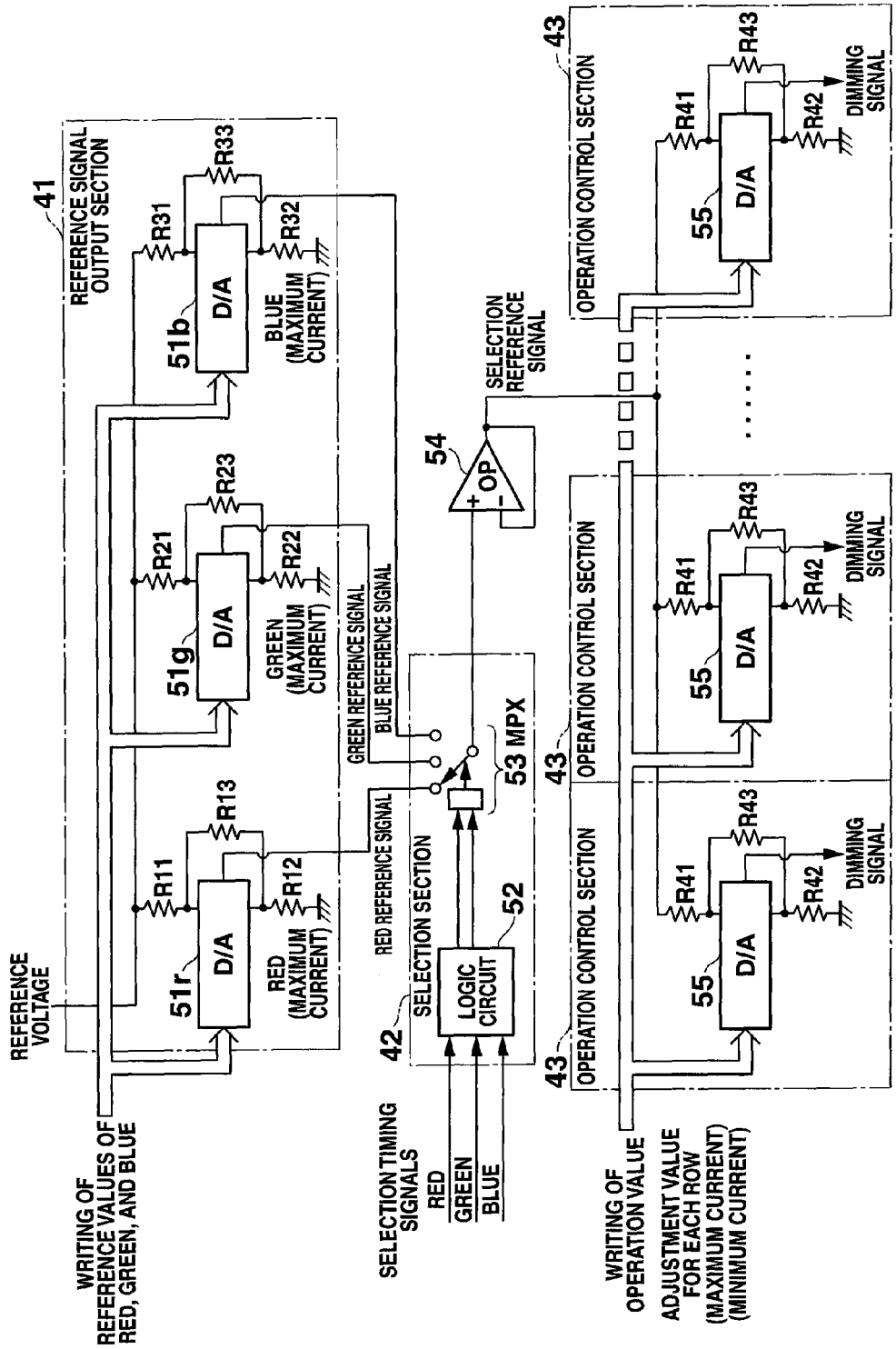
FIG. 3 is a view showing the specific configurations of a reference signal section, selection section, and operation control section of FIG. 2 according to the embodiment.

FIG. 3 is a view showing the specific configuration examples of a reference signal output section 41, selection section 42, and operation control sections 43 shown in FIG. 2.

In the reference signal output section 41, a reference value of each of red, green, and blue is written to each of digital-to-analog converters 51*r*, 51*g*, and 51*b*.

A reference voltage is applied to the digital-to-analog converter 51*r* through a resistor R11, the digital-to-analog converter 51*r* is grounded through a resistor R12, and a resistor R13 is connected between resistors R11 and R12. An output of the digital-to-analog converter 51*r* is output to the selection section 42 as a red reference signal indicating the maximum current value in the red field.

Likewise, the reference voltage is applied to the digital-to-analog converter 51*g* through a resistor R21, the digital-to-analog converter 51*g* is grounded through a resistor R22, and a resistor R23 is connected between both resistors R21 and R22. An output of the digital-to-analog converter 51*g* is output to the selection section 42 as a green reference signal indicating the maximum current value in the green field.

Likewise, the reference voltage is applied to the digital-to-analog converter 51*b* through a resistor R31, the digital-to-analog converter 51*b* is grounded through a resistor R32, and a resistor R33 is connected between both resistors R31 and R32. An output of the digital-to-analog converter 51*b* is output to the selection section 42 as a blue reference signal indicating the maximum current value in the blue field.

In the selection section 42, a selection timing signal synchronized with each of the fields of red, green, and blue is input to a logic circuit 52. A multiplexer (MPX) 53 is operated by a logic output of the logic circuit 52. The multiplexer 53 cyclically selects and outputs one of the red reference signal, green reference signal, and blue reference signal from the reference signal output section 41.

One of the reference signals of red, green, and blue output from the multiplexer 53 of the selection section 42 is buffered by an operational amplifier 54, and is thereafter supplied to one of the operation control sections 43 as a selection reference signal.

As described previously, each of the operation control sections 43 is provided separately for each of the LDs 17 which are control objects. Assuming that the total number of the LDs 17 is N (N is a natural number equal to or greater than 2), in each of the N operation control sections 43, the above-mentioned selection reference signal is supplied to a digital-to-analog converter 55 through a resistor R41.

To the digital-to-analog converter 55, the maximum current value and minimum current value corresponding to the element characteristic of a corresponding LD 17 are written as operation values. Furthermore, the digital-to-analog converter 55 is grounded through a resistor R42, and a resistor R43 is connected between resistors R41 and R42.

Further, an output of the digital-to-analog converter 55 is transmitted to a light source drive section 44 (not shown here) of the subsequent stage as a dimming signal indicating a current value adjusted for the LD 17.

It should be noted that in FIG. 3, the case where each of the reference signal output section 41, and operation control sections 43 is constituted of a digital-to-analog converter or digital-to-analog converters has been described. In place of the digital-to-analog converter or digital-to-analog converters, other element or elements configured to output a signal of a current value corresponding to a written value, such as a variable resistor or variable resistors may be used.

Next, an operation of the above-mentioned embodiment will be described below.

Figure 4:
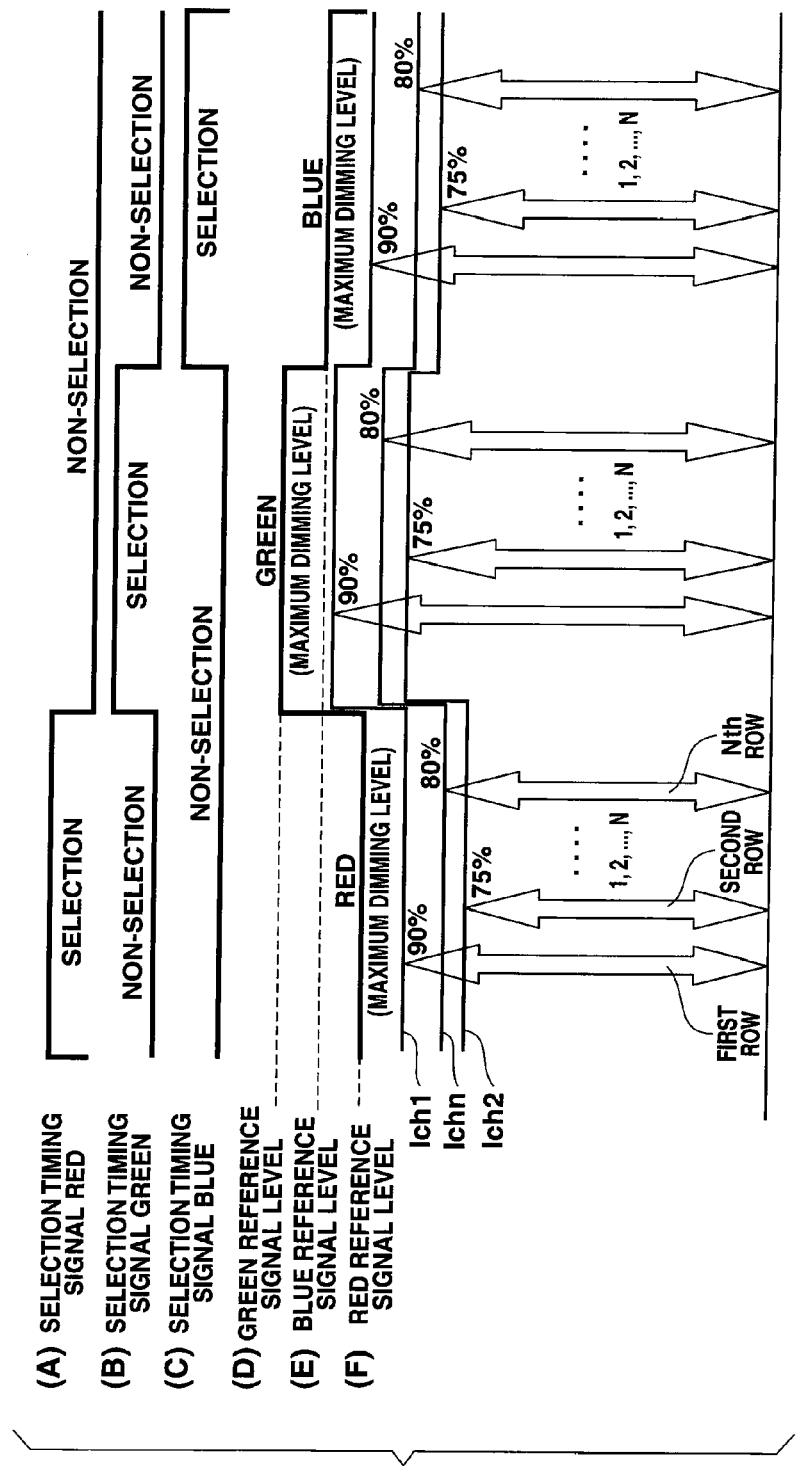
FIG. 4 is a timing chart showing various signal waveforms at the operation time according to the embodiment.

FIG. 4 is a view exemplifying signal waveforms for one frame during the time of image projection.

When an image of one frame is constituted of a red field, green field, and blue field in the order mentioned, selection timing signals red, green, and blue to be supplied to the selection section 42 are raised from a level "L" in the non-selection state to a level "H" in the selection state in the order shown by (A) to (C) in FIG. 4.

When the levels of the reference signal generated from the reference signal output section 41 in the fields of red, green, and blue are green>blue>red as indicated by broken lines in (D) to (F) in FIG. 4, a selection reference signal as indicated by a thick solid line in (D) to (F) in FIG. 4 is output from the selection section 42. Further, the output selection reference signal is supplied to the operation control sections 43. This selection reference signal corresponds to the maximum dimming level for each of the LDs 17.

Here, it is assumed that from the light-emitting characteristic of each of the N LDs 17 which are the objects to be driven, the first LD 17 is driven by a current value of 90% of the maximum dimming level, second LD 17 is driven by a current value of 75% thereof, ..., and Nth LD 17 is driven by a current value of 80% thereof.

In this case, information on the operation values specifying the maximum current value and minimum current value that realize the percentages of 90%, 75%, ..., and 80% is previously written to and held in the operation control sections 43.

Accordingly, each of the operation control sections 43 carries out an operation on the basis of the operation value written thereto, and by using the selection reference signal to be supplied thereto from the selection section 42, and outputs each of dimming control signals Ich1, Ich2, ..., and Ichn as shown in FIG. 4 as an operation result.

The dimming control signals Ich1, Ich2, ..., and Ichn are supplied to the light source drive sections 44 as signals each corresponding to a change in the selection reference signal of the maximum dimming level. Each of the light source drive sections 44 drives each of the LDs 17 which are the semiconductor light-emitting elements by a current value based on each of the dimming control signals Ich1, Ich2, ..., and Ichn, whereby each of the LDs 17 emits light at unified and desired luminance in accordance with the characteristic of each element.

As described above, according to this embodiment, an operation value corresponding to the light-emitting characteristic of each of the LDs 17 is written in advance to each of the operation control sections 43, whereby it is possible to simplify the configuration and control of the light source drive system to the utmost. Further, it is possible to quickly control each of the plurality of LDs 17 with a small processing quantity in order that each of the LDs 17 may emit light at an appropriate amount of light.

Modification Example

It should be noted that in the embodiment described above, the description has been given assuming that a current value corresponding to an operation value and reference signal in which the characteristic of each of the LDs 17 which are the objects to be driven, specifically, each of the maximum current value and minimum current value is taken into consideration, is calculated by each of the operation control sections 43, and each of the LDs 17 is driven by using the calculated value.

However, in each the LDs 17 which are semiconductor light-emitting elements, at the same time, the light-emitting characteristic is also largely changed by a temperature rise concomitant with light-emission.

Hereinafter, a modification example of this embodiment in which correction based on the temperature of the LDs 17 is additionally carried out will also be described below with reference to the drawings.

Figure 5:
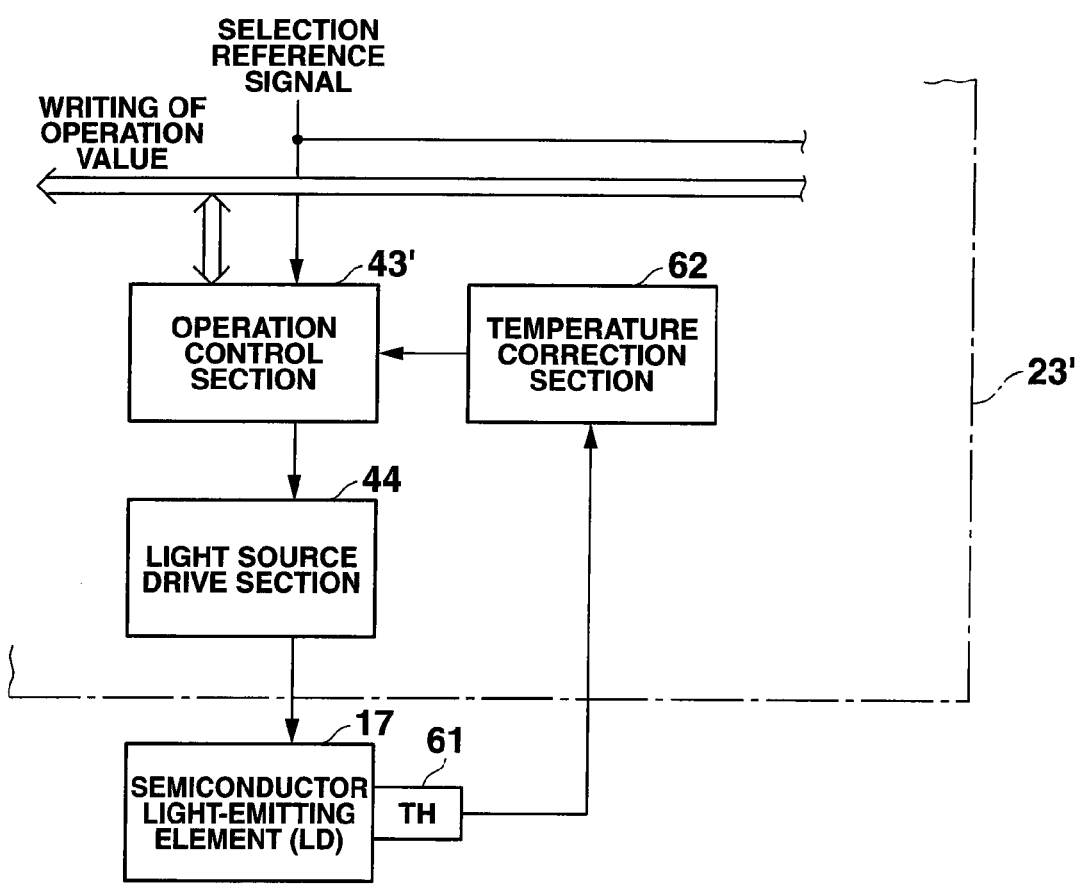
FIG. 5 is a block diagram showing the detailed functional configuration of part of a projection light processing section according to a modification example of the embodiment.

FIG. 5 is a block diagram showing, in order to simplify the description, only a line of the configuration from and after an operation control section 43' corresponding to the operation control section 43 in FIG. 2 in an extracting manner.

A dimming signal output from the operation control section 43' is transmitted to a light source drive section 44. The light source drive section 44 emission-drives an LD 17 which is a semiconductor light-emitting element to be driven in accordance with the dimming signal input thereto.

In the vicinity of the LD 17, a thermistor (TH) 61 is arranged as temperature detection means for detecting the temperature of LDs 17. A detection signal from the thermistor 61 is transmitted to a temperature correction section 62 in a projection light processing section 23'.

The temperature correction section 62 outputs a voltage signal corresponding to the temperature detected by the thermistor 61 to the operation control section 43', and changes a temperature gradient of the dimming signal output from the operation control section 43', thereby executing temperature correction.

Figure 6:
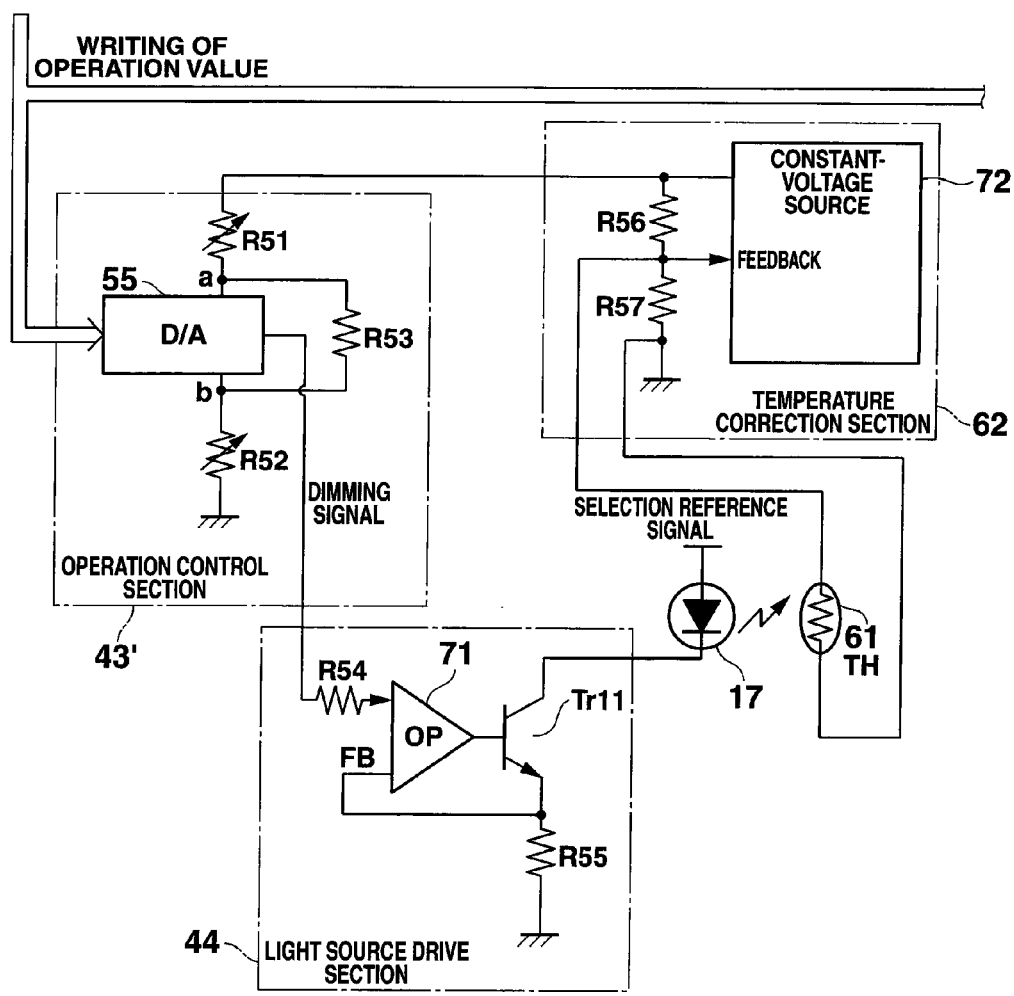
FIG. 6 is a view showing the specific configuration of an operation control section, light source drive section, and temperature correction section of FIG. 5 according to the modification example of the embodiment.

Next, a specific configuration example of FIG. 5 will be described below with reference to FIG. 6.

In the operation control section 43', two variable resistors R51 and R52, and digital-to-analog converter 55 interposed between them are connected in series, and resistor R53 is connected in parallel to the digital-to-analog converter 55. A constant voltage supplied from the temperature correction section 62 is applied to an end of variable resistor R51 on the side opposite to the digital-to-analog converter 55. Further, an end of variable resistor R52 on the side opposite to the digital-to-analog converter 55 is grounded.

A dimming signal output from the digital-to-analog converter 55 is input to an operational amplifier 71 through a resistor R54 inside the light source drive section 44. An output of the operational amplifier 71 is connected to a base of an NPN transistor Tr11. While an emitter of the NPN transistor Tr11 is grounded through a resistor R55, the emitter is connected to the feedback input terminal of the operational amplifier 71. A collector of the NPN transistor Tr11 is connected to a cathode of an LD 17. A selection reference signal from a reference signal output section 41 (not separately shown) is supplied to an anode of each of the LDs 17.

In the temperature correction section 62, while the constant voltage from a constant-voltage source 72 is applied to an end of series-connected resistors R56 and R57 on the resistor R56 side, an end of resistors R56 and R57 on the resistor R57 side is grounded. The thermistor 61 arranged in the vicinity of the LDs 17 is connected in parallel to resistor R57. Further, the midpoint of the two resistors R56 and R57 is feedback-connected to the constant-voltage source 72.

In the configuration described above, in the operation control section 43', the constant voltage supplied from the temperature correction section 62 is divided by variable resistors R51 and R52, and resistance-division ratio of the digital-to-analog converter 55, whereby a voltage level of the dimming signal is determined.

That is, the upper limit of the drive current adjustment range of the LD 17 is set by variable resistor R51, and lower limit thereof of the LD 17 is set by variable resistor R52. By using the two variable resistors R51 and R52, the voltage levels of the dimming signal which provide the maximum value and minimum value of the optimum operating current to the corresponding LD 17 are set at a point a, and point b in FIG. 6.

By the configuration described above, the behavior of the digital-to-analog converter 55 output in the whole span of 0% to 100% is synchronized with the whole span of the operating current range. Accordingly, it is sufficient if merely the percentage of the luminance is controlled by the operation value to be written to the digital-to-analog converter 55. In the projection light processing section 23', it is possible to realize simple dimming control irrespectively of the light-emitting characteristic of each of the LDs 17.

Further, the temperature correction section 62 is constituted of the constant-voltage source having a feedback adjustment function, and thermistor 61 serving as the temperature detection means arranged in the vicinity of the LD 17 is connected in parallel to resistor R57 of the feedback loop.

As a result of this, the output voltage to be supplied to the operation control section 43' changes with a temperature gradient. Accordingly, by changing the temperature gradient of the output voltage to be supplied to the operation control section 43' in accordance with the characteristic of the LD 17, it is possible to impart an optimum temperature gradient also to the dimming signal to be output from the operation control section 43' to the light source drive section 44.

Accordingly, it is possible to realize temperature control in the closed system of the projection light processing section 23' and LD 17, and reduce the load on the CPU 26 configured to carry out integrated control of the whole data projector apparatus 10.

Assuming here that the operation itself to be carried out by the light source drive section 44 and LD 17 is already known and, although the contents thereof are omitted, it is possible to change the operating current of the LD 17 in accordance with the magnitude of the voltage level of the input dimming signal.

Furthermore, a selection reference signal output from the selection section 42 is supplied to the anode of the LD 17, and hence, as a result, light-emission drive is carried out in accordance with both the maximum dimming level of the field at the point in time, and voltage level of the dimming signal.

As has been described above, in the modification example of this embodiment, by carrying out correction corresponding to the temperature of the semiconductor light-emitting element separately for each element, it is possible to cause each of the semiconductor light-emitting elements to emit light at correct luminance also corresponding to a change in temperature by a simple configuration without imposing a load, in the least, on the control system configured to carry out integrated control of the whole apparatus.

It should be noted that in the embodiment described above including the modification example, the case where a laser diode (LD) is used as the semiconductor light-emitting element has been described. However, it goes without saying that the present invention is not limited to this, and is also effective for cases where other semiconductor light-emitting elements such as a light emitting-diode (LED), organic electroluminescent element, and the like are used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source device comprising:
a plurality of semiconductor light-emitting elements configured to separately emit light of predetermined wavelength regions;
a reference signal output unit configured to output a reference signal common to the plurality of semiconductor light-emitting elements;
a control unit configured to convert the reference signal output by the reference signal output unit into dimming control signals to be fitted to light-emitting characteristics of the plurality of semiconductor light-emitting elements; and
a drive unit configured to drive the plurality of semiconductor light-emitting elements on the basis of the dimming control signals converted by the control unit.

2. The light source device according to claim 1, wherein the control unit is provided for each of the plurality of semiconductor light-emitting elements.

3. The light source device according to claim 1, wherein the reference signal is a signal representing a maximum current value or a maximum voltage value of each of the plurality of semiconductor light-emitting elements to be driven.

4. The light source device according to claim 1, wherein the control unit is configured to hold operation values fitted to the light-emitting characteristics of the plurality of semiconductor light-emitting elements, and to convert the reference signal to the dimming control signals on the basis of the operation values.

5. The light source device according to claim 4, wherein the operation values are information representing percentages relative to the reference signal.

6. The light source device according to claim 1, wherein the control unit includes a digital-to-analog converter, and is configured to input the operation values to the digital-to-analog converter and input the reference signal as an input voltage of the digital-to-analog converter, thereby converting the reference signal into the dimming control signals as output values of the digital-to-analog converter.

7. The light source device according to claim 1, further comprising a fluorescent substance having fields configured to emit fluorescence of a plurality of colors by irradiation of light of a predetermined wavelength region,
wherein the light source device is configured to time-divisionally generate the plurality of colors by using the plurality of semiconductor light-emitting elements and the fluorescent substance.

8. The light source device according to claim 1, wherein the reference signal output unit is configured to output the reference signal for each of the plurality of colors.

9. The light source device according to claim 8, further comprising a selection unit configured to select a reference signal for each of the plurality of colors output by the reference signal output unit in accordance with a light-emission timing of each of the plurality of colors time-divisionally generated.

10. The light source device according to claim 1, further comprising a projection mode holding unit configured to hold a plurality of projection modes,
wherein the reference signal output unit has a plurality of reference signal sets to correspond to the plurality of projection modes.

11. The light source device according to claim 1, wherein the control unit is configured to convert the reference signal such that brightness of the plurality of semiconductor light-emitting elements caused to emit light by the drive unit becomes uniform.

12. The light source device according to claim 1, further comprising a temperature detection unit, provided for each of the plurality of semiconductor light-emitting elements, and configured to detect a temperature of each semiconductor light-emitting element,
wherein the control unit is configured to convert the reference signal output by the reference signal output unit into each dimming control signal in accordance with a temperature of each of the semiconductor light-emitting elements detected by the temperature detection unit.

13. A projection apparatus comprising:
a light source device comprising:
- a plurality of semiconductor light-emitting elements configured to separately emit light of predetermined wavelength regions,
- a reference signal output unit configured to output a reference signal common to the plurality of semiconductor light-emitting elements,
- a control unit configured to convert the reference signal into dimming control signals to be fitted to light-emitting characteristics of the plurality of semiconductor light-emitting elements, and
- a drive unit configured to drive the plurality of semiconductor light-emitting elements on the basis of the dimming control signals converted by the control unit;

an input unit configured to input an image signal; and a projection unit configured to form and project a light figure of a color corresponding to the image signal input by the input unit by using light-source light from the light source device.

14. A projection method for use in a projection apparatus including a plurality of semiconductor light-emitting elements configured to separately emit light of predetermined wavelength regions, an input unit configured to input an image signal, and a projection unit configured to form and project a light figure of a color corresponding to the image signal input by the input unit by using light-source light from the plurality of semiconductor light-emitting elements, the method comprising:

outputting a reference signal common to the plurality of semiconductor light-emitting elements;

converting the output reference signal into dimming control signals to be fitted to light-emitting characteristics of the plurality of semiconductor light-emitting elements; and driving the plurality of semiconductor light-emitting elements on the basis of the dimming control signals.

* * * * *